United States Patent [19]

Evans

[11] Patent Number: 4,949,534
[45] Date of Patent: Aug. 21, 1990

[54] SWIVELING LAWN MOWER

[76] Inventor: Billy Evans, Rte. 5, Box 124, Belton, S.C. 29627

[21] Appl. No.: 422,700

[22] Filed: Oct. 17, 1989

[51] Int. Cl.$^5$ .............................................. E21B 34/00
[52] U.S. Cl. ......................................... 56/6; 56/13.8; 56/15.5
[58] Field of Search ...................... 56/13.7, 13.8, 14.9, 56/15.1, 15.2, 15.3, 15.5, 17.1, 255, DIG. 12, DIG. 14, 6

[56] References Cited

U.S. PATENT DOCUMENTS

| | | | |
|---|---|---|---|
| 3,583,133 | 6/1971 | Kasberger | 56/6 |
| 4,257,213 | 3/1981 | Brumat | 56/12.7 |
| 4,840,020 | 6/1989 | Oka | 56/15.2 |
| 4,858,418 | 8/1989 | von Allwoerden | 56/15.5 |
| 4,869,056 | 9/1989 | Lynch | 56/15.2 |
| 4,873,818 | 10/1989 | Turner | 56/15.3 X |

FOREIGN PATENT DOCUMENTS

| | | | |
|---|---|---|---|
| 2405803 | 8/1975 | Fed. Rep. of Germany | 56/13.8 |
| 1115281 | 5/1968 | United Kingdom | 56/13.8 |

Primary Examiner—William P. Neuder
Attorney, Agent, or Firm—Dority & Manning

[57] ABSTRACT

A lawn mowing apparatus is disclosed for use with a tractor or an auxiliary apparatus. The apparatus includes a trailer adapted to be connected to the hitch for the tractor, and a boom frame pivotally mounted on and above the trailer. One end of the boom frame supports an engine, while its other end supports a rotary cutting device operatively connected to the engine. A chain link drive element and sprockets engaged therewith effect pivoting movement of the boom frame relative to the trailer over about 280° sweep. A hand operated crank, operable by the rider on the tractor, is operatively connected to selectively pivot the boom frame to a desired position relative to the trailer. This effects swiveling movement of the frame in either direction and, consequently, selective movement of the rotary cutter device during a cutting operation. A pivot pin rotatably supports the boom frame for vertical movement of its opposite ends about the pivot pin. The weight of the engine biases the cutting device toward the ground, and a foot having a swiveling wheel maintains the cutting height of the cutting device.

19 Claims, 4 Drawing Sheets

SWIVELING LAWN MOWER

BACKGROUND OF THE INVENTION

The present invention relates to lawn mowers and particularly an auxiliary mower for use with self-propelled lawn mowers of the garden tractor type for permitting the operator to cut a wide range of types of vegetation such as grass, weeds, light brush and vines as found in lawns and adjacent areas and also for cutting vegetation around plants, trees, shrubs, etc. or other areas inaccessible for garden tractor types.

In particular, the present invention is directed to small tractors preferably of the garden type wherein the invention may be readily attached and detached therefrom and therefore serves as an auxiliary mowing apparatus in the form of an attachment mechanism.

In the art of auxiliary mowing apparatus arranged for attachment to a conventional tractor, the mechanisms utilized are either overly complicated and massive with regard to the specific structures utilized, and therefore are unsuitable for garden tractors, or the auxiliary mowing mechanisms are relatively limited as to the extent to which the cutting apparatus associated therewith is capable of reaching without overextending the operation of the host tractor. An example of the first category is illustrated and described in U.S. Pat. No. 2,451,589 to Thomas and comprises numerous wheeled frames interconnected by a supply of belts and chains and comprising parts which are relatively large and difficult to assemble and disassemble with respect to a host tractor. Similarly, the device described in U.S. Pat. No. 1,297,628 to Wodham comprises large apparatus interconnected by numerous drive devices for effecting the broad expanse of cutting capabilities of an area to be mowed.

In U.S. Pat. No. 2,791,953 to Erickson et al., a cultivator is described which is adapted to maneuver a cutting device around posts and row crops. However, the cultivator is not specifically adapted to be easily moved from one side of the tractor to the other in a semicircle which includes the area to the rear of the tractor. In addition, a mechanism for operating the cutting device comprises a hydraulic circuit which, although directly accessible to an operator seated on the tractor, nevertheless is relatively complex and costly for an auxiliary mowing machine particularly adapted for the ordinary garden tractor.

An example of the second category of attachment devices comprising mowing mechanisms for garden tractors is found in U.S. Pat. No. 3,508,384 to Madre. This patent illustrates and describes an auxiliary mowing mechanism for a garden tractor which, while fairly simple as to parts and efficiency, is not readily adapted for easy movement of the cutting apparatus from one side of the tractor to the other side in an arc defined perpendicular to the direction of movement of the tractor. Similarly, U.S. Pat. No. 3,624,698 to Storm describes a mowing attachment for a small tractor but is not provided with an arrangement whereby the cutting device may be easily swung from side to side of the tractor without detaching or attaching structures related thereto.

Therefore, one of the principal objects of the present invention is to improve tractor drawn lawn mowers or auxiliary cutting apparatus which may be swung from one side of the tractor to the other to enlarge the area for cutting during a cutting run by the tractor.

Another principal object of the present invention is to permit the easy and quick adjustment by an operator sitting on the tractor to manipulate a selected positioning of the cutting apparatus as the tractor is being moved.

A further principal object of the present invention is to provide an auxiliary cutting apparatus which can move vertically to adjust to terrain at different heights, yet is biased toward the ground so as to be sufficiently stable during operation to avoid a hazardous condition of exposing the cutting mechanism during the vertical adjustments of same that occur while traversing uneven terrain.

A still further principal object of the present invention is to lower the cost for auxiliary lawn mowers adapted for a wide range of cutting positions.

Another principal object of the invention is to arrange for permitting the grass cutting apparatus to be quickly and easily attached to or removed from the tractor.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out herein.

To overcome the above disadvantages and problems with conventional auxiliary lawn mowers for use with garden tractors and to accomplish the foregoing objects, the present invention has been devised so that an auxiliary lawn mower is adapted to be operatively connected to a tractor at a single point, such as a connection to the conventional hitch associated with the tractor. The auxiliary cutting apparatus of the present invention includes a wheeled trailer frame arranged to be directly and pivotally connected to the tractor's hitch. The trailer frame preferably includes a platform so that the wheeled platform serves as a support for the cutting apparatus. The trailer is provided with a vertically arranged pivot member which supports a cutter boom frame so that the cutter boom frame may be rotatably related to the trailer. The boom extends in opposite directions from the point where it is pivotally supported. Means for cutting vegetation, such as grass, weeds, light brush and the like, is mounted on one end of the cutter boom frame. Preferably, the cutting means includes a cutter apparatus of the rotary blade type that is pivotally mounted vertically for application to lawns or other areas and vegetation to be cut. The end of the cutter boom which carries the cutting means also has a wheel which supports the extended end of the cutter boom for movement across the ground or area to be cut and is arranged so that the plane of the cutter blade is supported at a cutting height above the area to be cut and preferably variably related as to such height. The opposite end of the cutter boom supports means for supplying power for imparting cutting action to the cutting means. Preferably, the power means includes an internal combustion engine, such as a gasoline motor, and a pulley therefor which is directly connected to a similar pulley operatively associated with the cutter blade at the other end of the cutter boom.

The cutter boom is adapted for swiveling action about the pivot axis of the pivot member on the trailer. Means are provided for pivoting the boom frame relative to the trailer frame over a range of from 0 to 280 degrees. Preferably, the pivoting means includes the pivot member and a closed loop drive element that engages a drive pulley or sprocket which is nonrotatably related to the boom frame. The pivot member is rotatable with respect to one of the trailer frame and the boom frame and nonrotatable with respect to the other of the trailer frame and the boom frame, whereby rotation imparted by the drive element effects pivotal movement of the boom frame with respect to the trailer frame. Preferably, the drive element includes a plurality of links joined together to form a chain that engages a drive mechanism in the form of a pulley or sprocket nonrotatably mounted to either the cutter boom frame or the pivot member. Rotation of this pulley or sprocket results in rotation of the cutter boom frame, which is nonrotatably related to such pulley or sprocket.

Means are provided for activating the pivoting means to selectively pivot the boom frame in a horizontal plane for moving the cutting means to selected cutting positions. As embodied herein, the activating means includes a pulley or sprocket rotatably mounted near the end of the trailer frame connected to the tractor. The drive element also engages this pulley or sprocket. A manually operable crank is connected to the trailer frame pulley or sprocket for direct operation by the operator while sitting on the tractor seat. In this arrangement, the cutter boom is adapted for complete and reversible swiveling action from one side of the tractor to the other side and is capable of cutting the approximately 280 degree area encompassed by its full swiveling action.

In addition, means preferably is provided for pivotally mounting the boom frame in a vertical plane thereby permitting the raising and lowering of the cutting means. As embodied herein, the means for permitting the raising and lowering of the cutting means preferably includes a pair of depending flanges disposed from beneath the boom frame and pivotally connected to a U-shaped member disposed at one end of the pivot member. A pivot pin extends through aligned openings in the flanges and U-shaped member, and the boom frame pivots about the longitudinal axis of the pivot pin to raise and lower the cutting means disposed on one end of the boom frame. Preferably, the boom frame is mounted on the pivot pin whereby the boom frame balances the weight of the cutting means and the power means so as to bias the cutting means towards the ground.

The objects of the invention mentioned above and other objects of the present invention will become apparent after reading the following written description taken in conjunction with the drawings, which are incorporated in and constitute a part of this specification. The accompanying drawings illustrate preferred embodiments of the invention and, together with the description, serve to explain the principles of the invention.

BRIEF DESCRIPTION OF THE DRAWINGS

FIG. 3b is a top plan view of presently preferred embodiments of components of the present invention showing a relationship to components illustrated in FIG. 3a;

FIG. 3c is a top plan view of presently preferred embodiments of components of the present invention showing a relationship to components illustrated in FIG. 3a.

DESCRIPTION OF THE PREFERRED EMBODIMENTS

Figure 1:
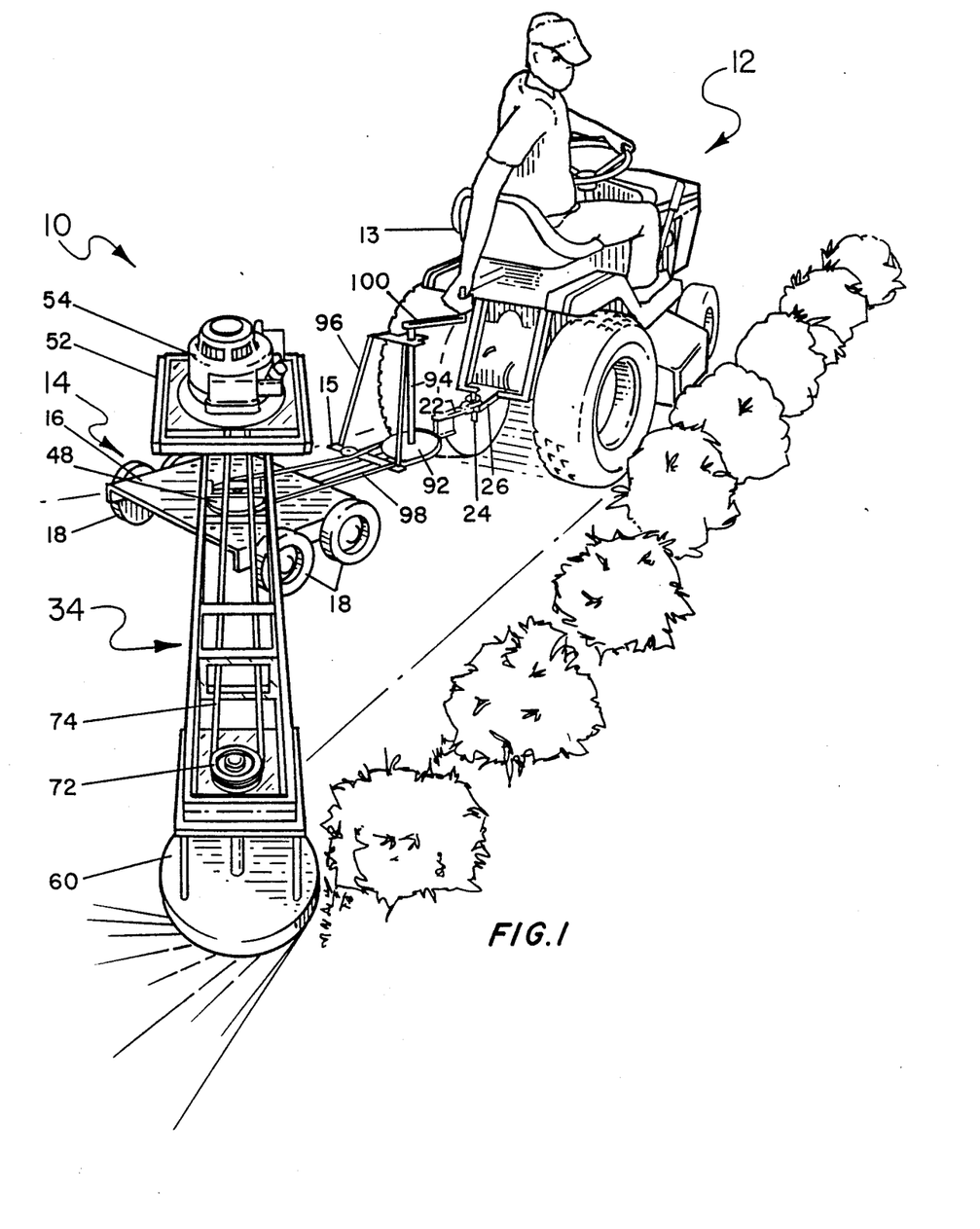
FIG. 1 is a perspective view of a preferred embodiment of the present invention being drawn by a tractor.

Referring to FIG. 1 of the drawings, a cutting apparatus devised in accordance with the present invention and generally indicated by the reference numeral 10, is shown attached to a garden type tractor 12, which has a seat 13 provided for carrying the operator of the tractor. Tractor 12 generally is referred to as a riding mower but may also be in the form of a regular farm tractor. For large tractors, the cutting apparatus may be enlarged for the cutting of weeds, brush, small trees and the like.

Figure 3A:
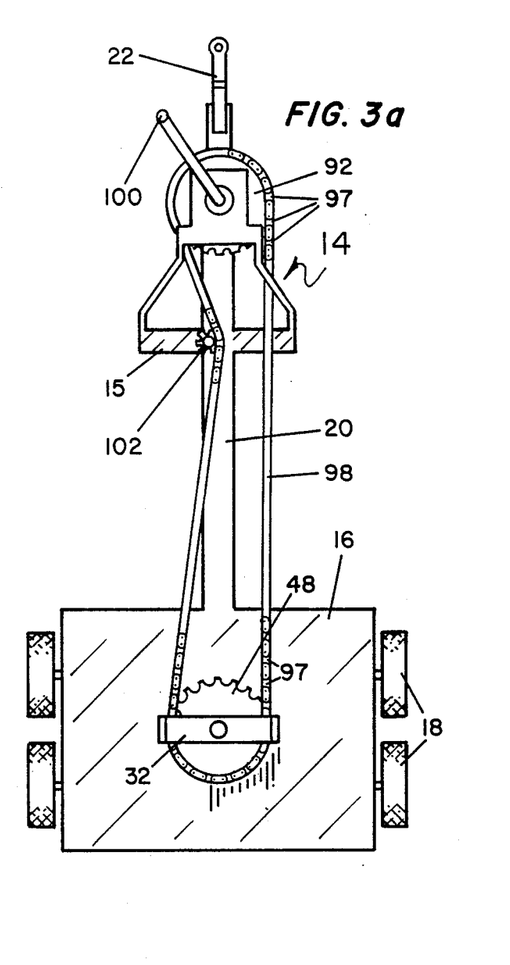
FIG. 3a is a top plan view of presently preferred embodiments, of components of the present invention.

As shown in FIG. 3a for example, the cutting apparatus 10 includes a wheeled vehicle or trailer designated generally by the numeral 14. As shown in FIG. 1 for example, trailer 14 preferably has a trailer frame 15, which extends beneath and supports a horizontal platform 16. Trailer frame 15 preferably has a plurality of rotatable wheels 18 disposed beneath platform 16 and supporting frame 15 and platform 16 above the ground.

Trailer frame 15 preferably is pivotally and detachably mountable to tractor 12. As shown in FIG. 3a for example, trailer frame 15 includes a tongue 20 to which is attached at one end a clevis 22. As shown in FIG. 1 for example, a pin 24 detachably connects clevis 22 to a trailer hitch 26 carried at the rear end frame of tractor 12.

Figure 2:
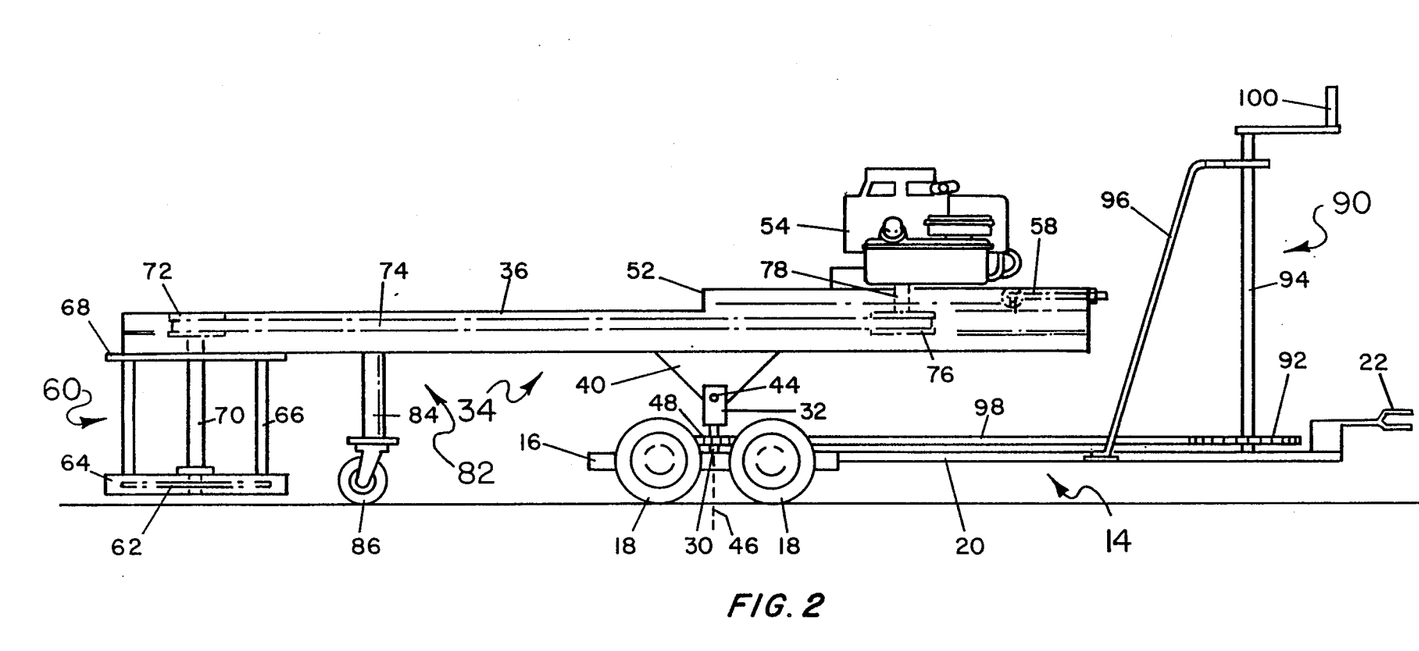
FIG. 2 is an elevational view of a preferred embodiment of the present invention.
Figure 3B:
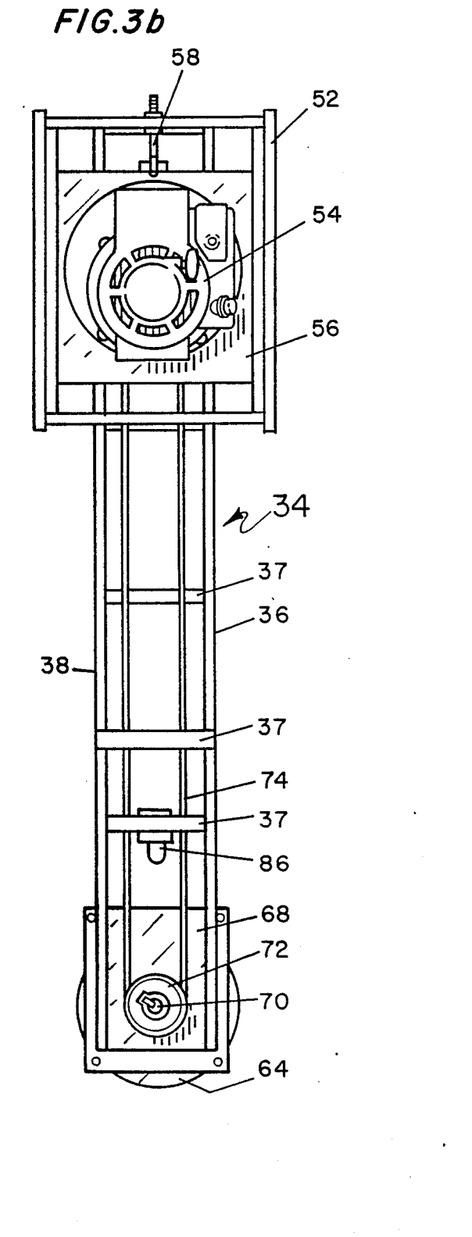
Figure 4:
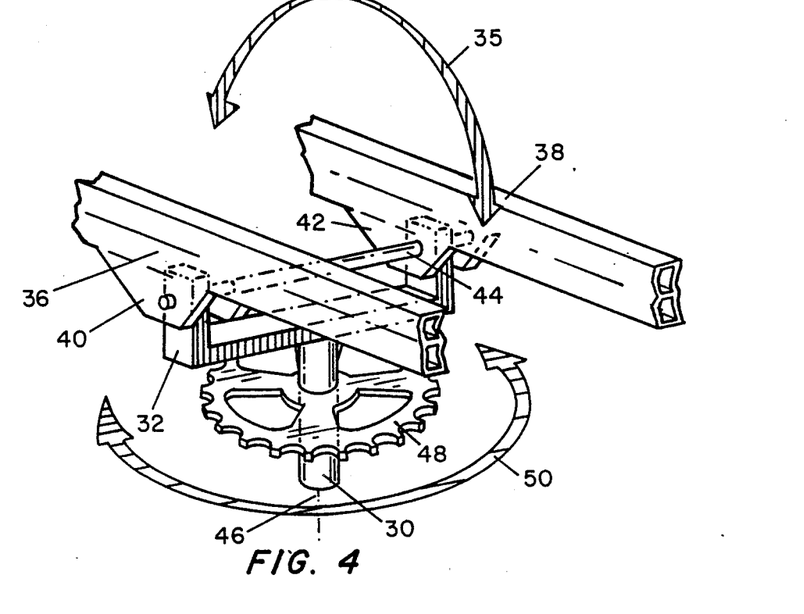
FIG. 4 is a perspective view of a detail of components of the present invention.

In accordance with the present invention, a cutter boom frame is provided. As shown in FIGS. 1, 2 and 3b for example, a cutter boom frame is designated generally by the numeral 34. As shown in FIG. 3b for example, boom frame 34 preferably includes at least two extrusions 36, 38 extending the length of boom 34. A plurality of crosspieces 37 extend between and rigidly connect extrusions 36, 38, which as shown in FIG. 4 for example can be formed of hollow metal tubing such as steel or aluminum tubing. Crosspieces 37 can be attached to extrusions 36, 38 by welding or conventional mechanical fasteners to form a sturdy rigid boom 34.

In accordance with the present invention, the cutter boom frame is pivotally carried by the trailer. Accordingly, a pivot member is carried by trailer 14 and is rotatable with respect to one of the trailer frame and the boom frame and nonrotatable with respect to the other of the trailer frame and the boom frame. In the embodiment shown in FIGS. 2 and 4 for example, the pivot member includes a shaft 30, which has a lower end rotatably mounted on platform 16 about shaft 30's vertically disposed axis 46 of rotation. As shown in FIG. 4, a U-shaped bracket 32 is secured to the opposite and upper end of rotatable shaft 30. As shown in FIGS. 3b and 4 for example, each of elongated structural members 36, 38, of frame 34 is formed with a respective depending flange element 40, 42. Each flange element 40, 42 has an aligned opening through which a pivot pin 44 projects and is carried rotatably with respect to the longitudinal axis of pivot pin 44. The legs of the U-shaped bracket 32 are similarly formed with aligned openings and are arranged to rotatably receive the pin 44 for engaging boom frame 34 nonrotatably with respect to axis 46 and shaft 30, but rotatably with respect to the longitudinal axis of pivot pin 44.

In another embodiment illustrated in the Figures, the pivot member carried by trailer 14 can be made rotatable about axis 46 with respect to the boom frame and nonrotatable with respect to the trailer frame. For example, shaft 30 can be nonrotatably carried by platform 16, and U-shaped bracket 32 can be rotatably mounted about axis 46 on the upper end of shaft 30.

Figure 3C:
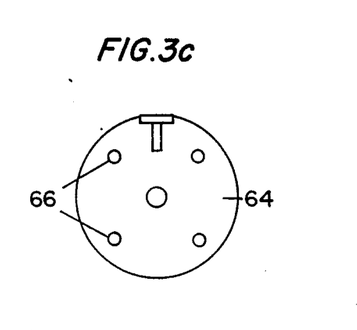

In accordance with the present invention, means is provided for cutting vegetation, such as grass, weeds, light brush and the like. The cutting means preferably is mounted on or suspended from one end of cutter boom frame 34. Preferably, the cutting means includes a cutter apparatus of the rotary blade type that is pivotally mounted vertically for application to lawns or other areas and vegetation to be cut. For example, a rotary cutter blade apparatus generally indicated in FIG. 2 by the reference numeral 60 is mounted at one end of the boom frame 34. As shown in FIGS. 2 and 3c for example, cutter apparatus 60 comprises a rotary cutter blade 62 mounted for rotation within a conventional housing guard 64 held in a horizontal orientation by a plurality of depending posts 66 secured to a plate 68 mounted at one outer end of the boom frame 34. The cutter blade 62 is mounted at the lower end of a cutter blade shaft 70 pivotally supported by the plate 68 by any suitable means not shown. At the upper end of the shaft 70, a pulley 72 is secured for imparting operational rotation to the cutter blade 62.

In further accordance with the present invention, means is provided for supplying power for imparting cutting action to the cutting means. Preferably, the power means is mounted near the end of the boom frame opposite the end near which the cutting means is mounted. As shown in FIGS. 1, 2 and 3b for example, a support frame 52 is mounted to the end of boom frame 34 opposite the end carrying the cutting means. Support frame 52 carries an internal combustion engine 54, such as a gasoline powered motor. As shown in FIG. 2 for example, in order to impart rotation to a cutting means pulley 72 and a blade 62 connected thereto, pulley 72 is operatively connected by a belt 74 to a drive pulley 76 secured to a drive shaft 78 of engine 54.

In further accordance with the present invention, means is provided for pivoting the boom frame relative to the trailer frame over a range of from 0 to 280 degrees. Preferably, the boom frame 34 is adapted for rotation in the horizontal plane about a vertically disposed axis 46 of the shaft 30. The pivoting means preferably includes a pivot member such as shaft 30. As shown in FIG. 4, for example, pivot member 30 is nonrotatably related to boom frame 34 with respect to axis 46 by a pivot pin 44. U-shaped bracket 32 is connected to flanges 40, 42, which depend respectively from extrusions 36, 38, by pivot pin 44.

The pivoting means further preferably includes a closed loop drive element that engages one of the pivot member and the boom frame, whereby rotation imparted by the drive element effects pivotal movement of the boom frame with respect to the trailer frame. As shown for example in FIG. 3a, the drive element preferably includes a plurality of links 97 joined together to form a chain 98.

The pivoting means still further preferably includes a drive mechanism that is nonrotatably related to the cutter boom frame so that rotation of the drive mechanism produces rotation of the boom frame. Accordingly, a drive mechanism in the form of a pulley or sprocket 48 is nonrotatably mounted to either the pivot member 30 or the cutter boom frame 34. In the embodiment shown in FIGS. 1, 2, 3a and 4 for example, sprocket wheel 48 is nonrotatably secured to the shaft 30 for rotation therewith about axis 46. A rotational drive force imposed by drive element 98 upon the sprocket 48 in either direction, as shown by the arrow 50 in FIG. 4, will induce corresponding rotation of the bracket 32 and the boom frame 34 about axis 46. Thus, the pivoting means provides the ability to rotate the boom frame 34 selectively in a horizontal plane from one side of the tractor 12 to the other side in a sweep extending over a range of more than 180° during a cutting operation.

In further accordance with the present invention, means is provided for activating the pivoting means to selectively pivot the boom frame in a horizontal plane for moving the cutting means to selected cutting positions. Preferably, the activating means is connected to the pivoting means and carried by the trailer frame near the tractor seat so as to be conveniently operable by the operator. As embodied herein and shown for example in FIG. 2, the activating means preferably includes a manually operable cranking mechanism indicated generally by the numeral 90. Mechanism 90 is accessible to the operator while seated on the tractor and operating the cutting means. The cranking mechanism 90 includes a crank shaft 94 which is vertically disposed upon the end of the tongue 20 adjacent the tractor 12 and rotatably mounted thereon. A sprocket 92 is secured at the lower end of crank shaft 94. The drive element also engages pulley or sprocket 92 rotatably mounted near the end of the trailer frame connected to the tractor. As embodied herein, chain 98 is operatively connected to the sprocket 92 and the sprocket 48 arranged on the trailer 14. A suitable idler gear 102 may be utilized on trailer frame 15 to permit adjustment of the tension on the chain 98.

The pivoting means preferably is reversibly activated. To this end, the upper end of the crank shaft 94 is connected to a hand crank 100 arranged to be reached and be operated by an operator sitting on the tractor. The upper end of the shaft 94 projects through a hole formed in a bracket 96 which angles downwardly and is secured to the tongue 20. Cranking action by the operator in either directional rotation of the crank 100 effects corresponding rotation of the sprockets 92 and 48, and therefore, the pivotal motion of the boom frame 34. As previously stated, the extent of the pivotal sweep of the boom has a range of over 180°, and preferably about 280 degrees, from one side of the tractor to the other side.

In yet further accordance with the present invention, means are provided for permitting the raising and lowering of the cutting means. As shown for example in detail in FIG. 4, the means for permitting the raising and lowering of the cutting means preferably includes a pivot pin 44 which connects flanges 40, 42, which depend respectively from extrusions 36, 38 of boom frame 34, for rotation relative to U-shaped bracket 32 about the longitudinal axis of pin 44. Bracket 32 thus supports cutter boom frame 34 for limited rotative movement relative to the axis of pivot pin 44 for permitting vertical movement of the ends of the boom frame, as indicated by the arrow 35 shown in FIG. 4.

In order to support the end of boom 34 carrying the cutting means, and also to permit regulation of the height of the cutter blade 62 relative to the ground for controlling the height of vegetation to be cut, boom 34 preferably is provided with a swivel wheel apparatus 82. Swivel wheel apparatus 82 includes a vertical support post 84 which extends from beneath boom 34. Apparatus 82 further comprises a swivelable support wheel 86 which is arranged to depend from post 84 and to be swivelable with respect to the longitudinal axis of post 84. Thus, support wheel 86 supports the end of the cutter boom which carries the cutting means, for movement across the ground or area to be cut. In addition, swivelable wheel apparatus 82 ensures that the plane of the cutter blade is supported at the desired cutting height above the area to be cut. As embodied herein, post 84 and/or wheel 86 can be extended in telescopic fashion relative to boom frame 34 by any conventional means (not shown in detail) such as a rack and pinion device or a screw device for example.

As shown for example in detail in FIG. 4, bracket 32 supports cutter boom frame 34 for limited rotative movement relative to the axis of pivot pin 44 for permitting vertical movement of the ends of the boom frame as indicated by the arrow 35. As noted in FIG. 2, the structures carried by boom frame 34 are arranged so that boom frame 34 is balanced about its axis of vertical rotation about the pin 44. The preferred balance is such that the power means biases the cutting means toward the ground. For example, engine 54 at one end of boom frame 34 biases the cutter device 60 and wheel apparatus 82 at the other end towards maintaining contact with the cutting plane and ground respectively. In this arrangement, the wheel apparatus 82 suffices as a single foot device, and a second foot device disposed beneath engine 54 becomes unnecessary to keep blade 62 in the proper cutting plane. The balanced arrangement of the present invention ensures that the cutting means remains facing the ground during height adjustments which accommodate height changes resulting from the traversal of different terrains during the cutting procedure. Dangerous exposure of the cutting blade and unevenly cut areas are thereby avoided.

To facilitate adjustments for maintenance of the desired balance, as shown in FIG. 3b, engine 54 is supported upon a plate 56 arranged for forward and rearward sliding movement within the frame 52 by means of an adjusting screw 58, which is adjustably positionable relative to one end of the frame 52.

From the foregoing, it will be appreciated that the present invention comprises a minimum of parts which are simple in nature and low in cost. It will also be appreciated that the cutting apparatus may be quickly attached or detached from a tractor requiring no tools and a minimum of time, and that the full range of coverage of the rotary cutting mechanism is available to the operator while remaining in the sitting position on the tractor and while the same continues to move.

While the invention has been explained with reference to the structures disclosed, it will be apparent to those skilled in the art that various modifications and variations can be made in the present invention without departing from the scope or spirit of the invention. The invention is not confined to the specific details set forth in the written description and drawings, which are provided to explain and illustrate the invention, not unduly limit it. Thus, it is intended that the present invention cover whatever modifications and variations of this invention that come within the scope of the appended claims and their equivalents.

What is claimed is:
1. A lawn mower arranged for connection to a tractor having a seat for an operator comprising:
a trailer frame pivotally and detachably mountable to the tractor, said trailer frame having one or more wheels arranged thereon for supporting said frame above the ground;
a cutter boom frame pivotally carried by said trailer frame;
means for cutting vegetation, said cutting means being mounted at one end of said boom frame;
means for supplying power for imparting cutting action to said cutting means, said power means being mounted at the opposite end of said boom frame and connected to said cutting means;
means for pivoting said boom frame relative to said trailer frame over a range of from 0 to 280 degrees;
means for activating said pivoting means to selectively pivot said boom frame in a horizontal plane for moving said cutting means to selected cutting positions, said activating means being connected to said pivoting means and carried by said trailer frame so as to be conveniently operable by the operator, and
wherein said activating means includes a hand operable crank carried by said trailer frame for operation near the seat of the tractor.
2. The lawn mower defined in claim 1, wherein said power means is an internal combustion engine having a drive pulley associated therewith and a belt connected between said pulley and said cutting means.
3. The lawn mower defined in claim 1, further including means for permitting the raising and lowering of said cutting means.
4. The lawn mower defined in claim 1 wherein said means for permitting the raising and lowering of said cutting means includes a bracket carried by said trailer frame and engaged to said boom frame so as to permit the ends of said boom frame to pivot vertically with respect to said bracket.
5. A lawn mower arranged for connection to a tractor having a seat for an operator comprising:
a trailer frame pivotally and detachably mountable to the tractor, said trailer frame having one or more wheels arranged thereon for supporting said frame above the ground;
a cutter boom frame pivotally carried by said trailer frame;
means for cutting vegetation, said cutting means being mounted at one end of said boom frame;
means for supplying power for imparting cutting action to said cutting means, said power means being mounted at the opposite end of said boom frame and connected to said cutting means;
means for pivoting said boom frame relative to said trailer frame over a range of from 0 to 280 degrees wherein said pivoting means includes a pivot member carried by said trailer frame and pivotally supporting said boom frame, said pivoting means further including a closed loop drive element engaging said activating means and one of said pivot member and said boom frame; and
means for activating said pivoting means to selectively pivot said boom frame in a horizontal plane for moving said cutting means to selected cutting positions, said activating means being connected to said pivoting means and carried by said trailer frame so as to be conveniently operable by the operator.

6. The lawn mower defined in claim 5 wherein said pivot member is rotatable with respect to one of said trailer frame and said boom frame and nonrotatable with respect to the other of said trailer frame and said boom frame whereby rotation imparted by said pivoting means effects pivotal movement of said boom frame about said pivot member.

7. The lawn mower defined in claim 6 wherein said closed loop drive element includes a plurality of chain links and said pivoting means includes a rotatable sprocket engagable with said links.

8. The lawn mower defined in claim 5 wherein said boom frame is pivotally mounted whereby the weight of said power means biases said cutting means towards the ground.

9. A lawn mower arranged for connection to a tractor having a seat for an operator comprising:
   a trailer frame pivotally and detachably mountable to the tractor, said trailer frame having one or more wheels arranged thereon for supporting said frame above the ground and including a platform;
   a cutter boom frame pivotally mounted with respect to said trailer frame;
   means for cutting vegetation, said cutting means being mounted on one end of said boom frame;
   means for supplying power for imparting cutting action to said cutting means, said power means being mounted on the opposite end of said boom frame and connected to said cutting means;
   means for pivoting said boom frame relative to said trailer frame over a range of from 0 to 280 degrees, wherein said pivoting means includes a closed loop drive element arranged for imparting selective rotation of said boom frame; and
   a pivot member disposed generally vertically on said platform;
   means for activating said pivoting means to selectively pivot said boom frame in a horizontal plane for moving said cutter means to selected cutting positions, said activating means being connected to said closed loop drive element and carried by said trailer frame between the tractor and said pivot member so as to be conveniently operable by the operator.

10. The lawn mower defined in claim 9 wherein said closed loop drive element includes a plurality of chain links and said activating means includes a rotatable sprocket engagable with said links.

11. The lawn mower defined in claim 9 wherein said pivot member is rotatable with respect to one of said trailer frame and said boom frame and nonrotatable with respect to the other of said trailer frame and said boom frame whereby rotation imparted by said pivoting means effects pivotal movement of said boom frame about said pivot member.

12. The lawn mower defined in claim 9, further including means for pivotally mounting said boom frame in a vertical plane thereby permitting the raising and lowering of the cutting means.

13. The lawn mower defined in claim 9 wherein said boom frame is mounted on said pivot member whereby said frame is generally in balance with respect to the weight of said cutting means and said power means so as to bias said cutting means toward the ground.

14. The lawn mower defined in claim 9 wherein said pivot member is positioned between said cutting means, and said power means.

15. A lawn mower arranged for connection to a tractor having a seat for an operator comprising:
   a trailer frame pivotally and detachably mountable to the tractor, said trailer frame having one or more wheels arranged thereon for supporting said frame above the ground and including a platform;
   a cutter boom frame pivotally mounted with respect to said trailer frame;
   means for cutting vegetation, said cutting means being mounted on one end of said boom frame;
   means for supplying power for imparting cutting action to said cutting means, said power means being mounted on the opposite end of said boom frame and connected to said cutting means;
   means for pivoting said boom frame relative to said trailer frame over a range of from 0 to 280 degrees, wherein said pivoting means includes a closed loop drive element arranged for imparting selective rotation of said boom frame and including a plurality of chain links;
   a pivot member disposed generally vertically on said platform, said pivot member being rotatable with respect to one of said trailer frame and said boom frame and nonrotatable with respect to the other of said trailer frame and said boom frame; and
   means for activating said pivoting means to selectively pivot said boom frame in a horizontal plane for moving said cutter means to selected cutting positions, said activating means being connected to said closed loop drive element and carried by said trailer frame between the tractor and said pivot member so as to be conveniently operable by the operator, said activating means including a rotatable sprocket engagable with said links.

16. The lawn mower defined in claim 15, further including means for pivotally mounting said boom frame in a vertical plane thereby permitting the raising and lowering of the cutting means.

17. The lawn mower defined in claim 16 wherein said boom frame is mounted on said pivot member whereby said frame is generally in balance with respect to the weight of said cutting means and said power means so as to bias said cutting means toward the ground.

18. The lawn mower defined in claim 16 wherein said pivot member is positioned between said ends of said boom frame and intermediate said cutting means and said power means mounted thereto.

19. The lawn mower defined in claim 17 wherein said power means is a gasoline motor having a drive pulley associated therewith and a belt connected between said pulley and said cutting means.

* * * * *

UNITED STATES PATENT AND TRADEMARK OFFICE
CERTIFICATE OF CORRECTION

PATENT NO. : 4,949,534

DATED : August 21, 1990

INVENTOR(S) : Billy Evans

It is certified that error appears in the above-identified patent and that said Letters Patent is hereby corrected as shown below:

Column 8, line 36: change "1" to read --3--.

Signed and Sealed this

Tenth Day of December, 1991

Attest:

HARRY F. MANBECK, JR.

*Attesting Officer*     *Commissioner of Patents and Trademarks*